United States Patent
Stroobach et al.

(10) Patent No.: US 7,668,982 B2
(45) Date of Patent: Feb. 23, 2010

(54) SYSTEM AND METHOD FOR SYNCHRONOUS PROCESSING OF MEDIA DATA ON AN ASYNCHRONOUS PROCESSOR

(75) Inventors: Jeroen Stroobach, Kanata (CA);
Douglas Thomas Petty, Nepean (CA);
Michel Daniel Belanger, Kanata (CA);
Mildo De Groot, Capelle a/d Ijssel (NL); Joseph Patrice André D'Iorio, Ottawa (CA); Vladimir Kukic, Ottawa (CA)

(73) Assignee: Pika Technologies Inc., Kanata (CA)

( * ) Notice: Subject to any disclaimer, the term of this patent is extended or adjusted under 35 U.S.C. 154(b) by 466 days.

(21) Appl. No.: 11/313,774

(22) Filed: Dec. 22, 2005

(65) Prior Publication Data

US 2006/0143336 A1    Jun. 29, 2006

Related U.S. Application Data (60) Provisional application No. 60/637,872, filed on Dec. 22, 2004.

(51) Int. Cl.
G06F 3/00 (2006.01)
G06F 13/00 (2006.01)
(52) U.S. Cl. .......................... 710/48; 710/52
(58) Field of Classification Search ................ None
See application file for complete search history.

(56) References Cited

U.S. PATENT DOCUMENTS

| 4,177,515 | A  |   | 12/1979 | Jenkins et al. |
|-----------|----|---|---------|----------------|
| 4,495,571 | A  |   | 1/1985  | Staplin, Jr. et al. |
| 4,604,682 | A  |   | 8/1986  | Schwan et al. |
| 2002/0037160 | A1 | * | 3/2002 | Locket et al. ............. 386/111 |
| 2002/0087712 | A1 | * | 7/2002 | Awasthi ..................... 709/233 |
| 2002/0141427 | A1 | * | 10/2002 | McAlpine .................. 370/413 |
| 2005/0089033 | A1 | * | 4/2005 | Gupta et al. ............... 370/389 |

OTHER PUBLICATIONS

Kreuzinger, A. et al., "Real-time Scheduling on Multithreaded Processors"; Proceedings of Seventh International Conference on Real-Time Computing Systems and Applications, IEEE, Dec. 12-14, 2000; pp. 155-159.

* cited by examiner

*Primary Examiner*—Tariq Hafiz
*Assistant Examiner*—Scott Sun
(74) *Attorney, Agent, or Firm*—Leslie A. Kinsman; Borden Ladner Gervais LLP (57) ABSTRACT

The present invention provides a method and system for processing media data on a host processor. The method and system involve receiving media data, generating clocking signals, transferring media data to host processor buffers, generating media transfer done interrupts for each media data stream and generating an override interrupt to indicate to the host processor to process the media data. The override interrupt has high priority and effectively indicates to the host processor to forgo all other scheduled tasks and to start processing the media data.

11 Claims, 5 Drawing Sheets

SYSTEM AND METHOD FOR SYNCHRONOUS PROCESSING OF MEDIA DATA ON AN ASYNCHRONOUS PROCESSOR

CROSS REFERENCE TO RELATED APPLICATIONS

This application claims the benefit of U.S. Provisional Application No. 60/637,872, filed 22 Dec. 2004, which is incorporated herein by reference.

FIELD OF THE INVENTION

The present invention relates generally to media processing. More particularly, the present invention relates to audio stream processing.

BACKGROUND OF THE INVENTION

In the field of telecommunications processing, the development of the private branch exchange (PBX) provided medium to large size enterprises with the ability to provide numerous telephony services without relying upon a central carrier for the provision of the services. Thus, a PBX could provide a medium to large sized enterprise with the ability to provide employees extensions from a central number, each extension being served by a voicemail or other telephony service, without relying upon the telephone service carrier to provide these services. PBX equipment is dedicated equipment designed to service only standard telephony needs. Although this provided a cost effective solution for a number of companies, standard PBX systems are too costly for smaller enterprises, and do not provide the level of telephony service functionality required by many industries.

To provide a simpler solution aimed at smaller markets, standard personal computing platforms have been used as the basis for telephony services. These systems have typically relied upon dedicated expansion cards to provide both a connection to the telephone network (or to a PBX served network) and to provide much of the call processing required. A number of drawbacks to this solution have arisen. Dedicated processors, or digital signal processors (DSP), are typically required on the interface cards as operating systems such as Microsoft Windows XP, Linux and Apple's OS X are not truly designed to perform real time processing on asynchronous streaming data. The dedicated processors are provided on the expansion cards, and typically require a dedicated memory on the card as well. This increases the cost of the card, and also has other adverse side effects including increasing the heat generated in the computer chassis.

In many applications, personal computers with the dedicated expansion cards are used to perform a number of telephony and non-telephony activities. These systems are often used to process the audio in a number of ways, including call logging and recording. Furthermore, the resources of the computer can be used for other telephony functions, such as using the hard drive of the personal computer as storage for both call recording and voice messaging services. The programmability of the personal computer allows monitoring and other related functions to be triggered by any number of variables including time of day, the number dialled, the number a call is received from, the detection of signalling tones originating from either the local or remote phone, and other such variables that will be apparent to those skilled in the art.

These systems can also be deployed in environments such as call centers, where the computer can be used to support non-telephony functions such as databases that access the phone number of the remote party to allow a call operator to access information such as call history and products purchased to allow simplified customer service. As a result, the host computer cannot be treated as a dedicated system because other applications related to, but not directly supporting, the telephony functionality must be able to run on the processor without either degrading the media processing or being degraded by the media processing.

One skilled in the art will appreciate that in addition to audio processing, these system are often employed in the handling of video for videoconferencing and other related functions. The host processor is often employed to adjust the display of the video streams to suit the needs of the viewer. As the video processing for display, and the video processing for both the receiving and transmitting, along with the accompanying decoding and encoding, must be performed in real time, the use of expensive dedicated hardware has been relied upon to provide the stability demanded by users.

Therefore, it is desirable to provide a computer based system for processing media stream data that would have the media data processing carried out on the computer processor and that would not require DSPs on interfacing boards connected to the computer. Further, it is also desirable that the computer-based system provides excellent real-time processed media data while allowing undisrupted performance of other applications running on the computer.

SUMMARY OF THE INVENTION

It is an object of the present invention to obviate or mitigate at least one disadvantage of previous host media processing systems.

In a first aspect, the present invention provides a method of processing media data received from a plurality of sources in a non-real time system. The method comprises steps of: receiving a stream of media data units from at least one of the plurality of sources and transferring the received data units to a processor input buffer; generating a clocking signal associated with the at least one source; generating an override interrupt in accordance with the clocking signal and a required processing action to indicate the transfer of data units to the processor input buffer; suspending processing in response to the generation of the override interrupt; performing the required processing action on the data units in the processor input buffer, storing the result of the required processing action in a processor output buffer and clearing the interrupt; and transferring the data from the processor output buffer to at least one of the plurality of sources. The override interrupt can be, for example, a deferred procedure call in a Microsoft Windows environment, or a tasklet in a Linux environment.

According to embodiments of this aspect, the step of transferring the received data units to a processor input buffer can include initiating a direct memory access operation to transfer the data units to the processor input buffer. The step of receiving a stream of media data units can include receiving data frames from one or more of a private branch exchange network, public switched telephone network, channel bank, locally connected phones or a packet network. And, the step of generating a clocking signal can include extracting a clocking signal from at least one source. The method can include a further step of dividing the required processing action into a series of required processing actions, and each of the series of required processing actions can be performed in a portion of the clocking signal period. For example, the portion of the clocking signal period can be less than 50%.

In a further aspect, the present invention provides a system for processing media data received from a plurality of sources in using a non-real time system. The system comprises a first media interface, for receiving data from a first external communications network, and for placing the received data into a first input buffer; a second media interface, for transferring data in a second output buffer to a second external communications network; an interrupt scheduler for scheduling execution of a task on a media processor, and for generating an interrupt signal on the media processor in accordance with the scheduled tasks; and a media processor for suspending processing of tasks upon receipt of the interrupt generated by the interrupt scheduler, for executing the task scheduled in accordance with the generated interrupt on the data in the first input buffer and for providing the output of the scheduled task to the second output buffer.

According to embodiments of the system, the first media interface can further include a first output buffer and means to transfer data from the first input buffer to the first external communications network, and the second media interface can further include a second input buffer for receiving data from the second external communications network. The media processor can include direct memory access means for accessing the contents of the first and second input buffers, and can include a means for executing scheduled tasks in accordance with scheduled tasks on the data in the second input buffer and for providing the output of the scheduled task to the first output buffer. The system can also include a third media interface, having third input and output buffers, the interface for receiving data from a third external communications network, for placing the received data into a third input buffer, and for transferring data in the third output buffer to the third external communications network. A media bridge for allowing similar system access to the first and second media interfaces can also be included.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

The present invention generally provides a mechanism for a standard computing platform without a real-time operating system to provide media processing for asynchronous data stream through the use of interrupt processing and task scheduling.

Figure 1:
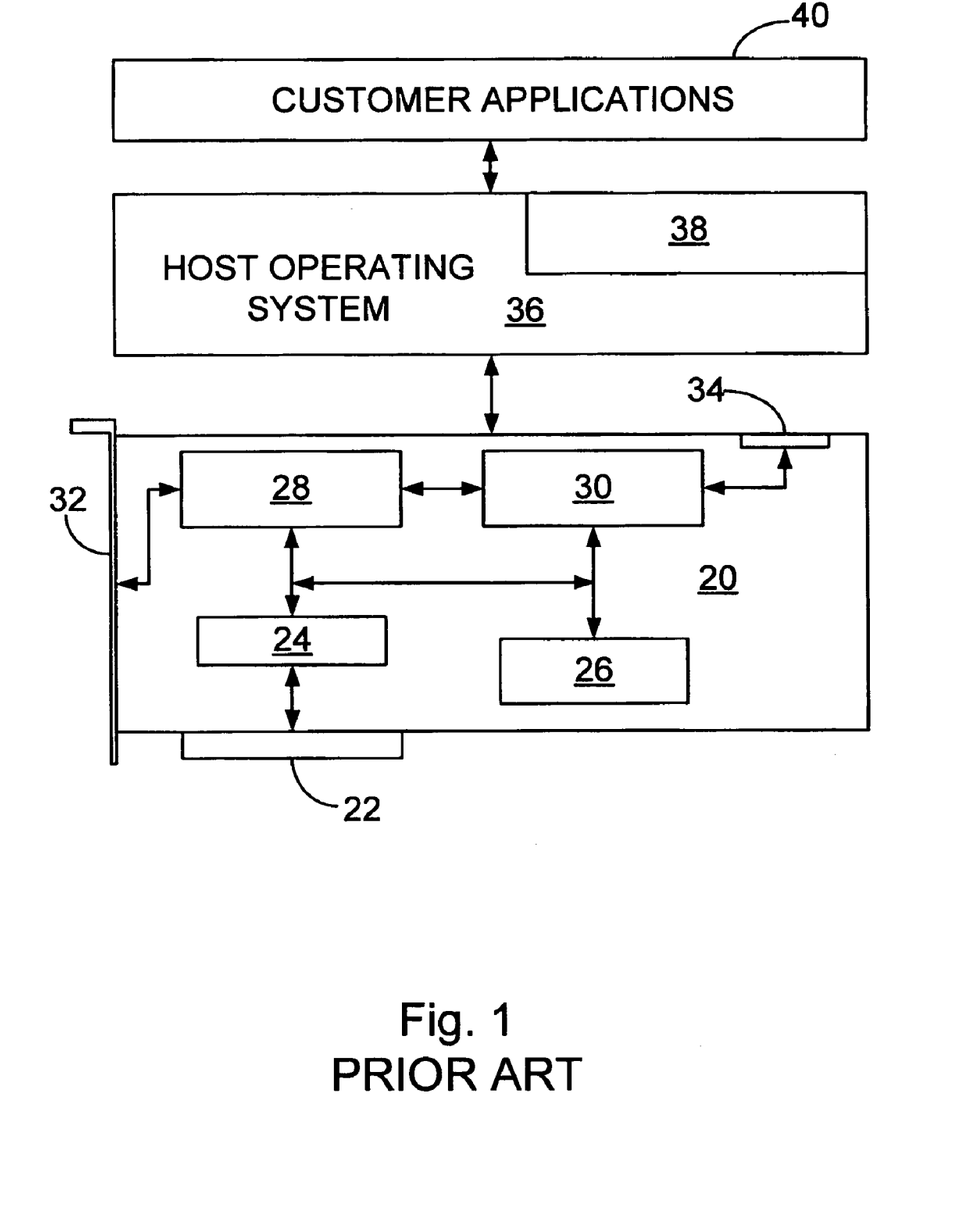
FIG. 1 is a depiction of a prior art approach to media data stream processing.

FIG. 1 depicts a prior art approach to media data stream processing. Expansion board 20, such as a time division multiplexing (TDM) expansion board, connects a network such as a public switched telephone network (PSTN) to a host computer (not shown) through local bus connector 22. Board 20 includes a local bus interface 24 in communication with a DSP 26, a network interface 28 and a digital switch 30. The expansion board 20 receives media streams stemming from networks such as the public switched telephone network (PSTN) or private branch exchange (PBX) networks via a connection plane 32. Other expansion boards (not shown) receive other media data streams such as real-time voice and facsimile streams which can be relayed through board 20 using a computer telephony bus interface 34. A common implementation of the expansion board 20 includes a peripheral component interconnect (PCI) bus as the local bus and a H.100 bus as the computer telephony bus. The host operating system 36 and the expansion board driver 38 link the customer application 40 and the expansion board 20.

In audio data stream processing using prior art technology such as depicted in FIG. 1, audio data streams are processed and switched on the expansion board 20. The digital switch 30 enables audio streams to flow from one channel to another with delays that are typically less than 0.5 ms. The audio streams can also be switched to and from the expansion board 20 to perform functions such as detecting dual tone multi-frequency (DTMF) tones, adjusting gain, conference mixing, echo cancellation, etc. The end-to-end audio latency is typically less than 1 ms and no jitter is present.

In the field of telecommunications processing, the development of the private branch exchange (PBX) provided medium to large size enterprises with the ability to provide numerous telephony services without relying upon a central carrier for the provision of the services. Thus, a PBX could provide a medium to large sized enterprise with the ability to provide employees, extensions from a central number, each extension being served by a voicemail or other telephony service, without relying upon the telephone service carrier to provide these services. PBX equipment is dedicated equipment designed to service only standard telephony needs. Although this provided a cost effective solution for a number of companies, standard PBX systems are too costly for smaller enterprises, and do not provide the level of telephony service functionality required by many industries.

To provide a simpler solution aimed at smaller markets, standard personal computing platforms have been used as the basis for telephony services. These systems have typically relied upon dedicated expansion cards to provide both a connection to the telephone network (or to a PBX served network) and to provide much of the call processing required. A number of drawbacks to this solution have arisen. Dedicated processors are typically required, as operating systems such as Microsoft Windows XP, Linux and Apple's OS X are not truly designed to perform real time processing on asynchronous streaming data. The dedicated processors are provided on the expansion cards, and typically require a dedicated memory on the card as well. This increases the cost of the card, and also has other adverse side effects including increasing the heat generated in the computer chassis.

In many applications, personal computers with the dedicated expansion cards are used to perform a number of telephony and non-telephony activities. These systems are often used to process the audio in a number of ways, including call logging and recording. Furthermore, the resources of the computer can be used for other telephony functions, such as using the hard drive of the personal computer as a storage for both call recording and voice messaging services. The programmability of the personal computer allows monitoring and other related functions to be triggered by any number of variables including time of day, the number dialled, the number a call is received from, the detection of signalling tones originating from either the local or remote phone, and other such variables that will be apparent to those skilled in the art.

These systems can also be deployed in environments such as call centers, where the computer can be used to support non-telephony functions such as databases that access the phone number of the remote party to allow a call operator to access information such as call history and products purchased to allow simplified customer service. As a result, the host computer cannot be treated as a dedicated system because other applications related to, but not directly supporting, the telephony functionality must be able to run on the processor without either degrading the media processing or being degraded by the media processing.

One skilled in the art will appreciate that in addition to audio processing, these system are often employed in the handling of video for videoconferencing and other related functions. The host processor is often employed to adjust the display of the video streams to suit the needs of the viewer. As the video processing for display, and the video processing for both the receiving and transmitting, along with the accompanying decoding and encoding, must be performed in real time, the use of expensive dedicated hardware has been relied upon to provide the stability demanded by users.

There is a need for simplified systems that can reduce the reliance upon dedicated hardware solutions that increase the cost and power consumption of these systems.

The present invention provides a system and method for media processing that reduces the reliance on dedicated media processing hardware and makes use of the underlying computer system. This is done in a fashion that permits the non-real time operating system to serve the real time demands of a plurality asynchronous media streams without allowing the processor to be monopolized by the media processing.

In telephony systems, processing lag becomes apparent to the users when it exceeds a total threshold. When the threshold is exceeded, the call lag becomes audibly perceptible to an untrained listener, and the call handling is perceived as insufficient. As a result, shifting the processing from a dedicated hardware platform to a general purpose computing platform must be done in a manner that does not introduce noticeable lag time, but that at the same time does not increase the demands placed on the processor to such an extent that other applications running on the processor seem to be either choppy or periodically non-responsive.

In the present invention, a general-purpose computer is employed to perform many media processing tasks. A variety of interface cards are provided, as needed, to allow media streams to be received by the system. In stark contrast to the prior art solutions, the interface cards do not perform the media processing, and as a result, standard components can be used as processors and memory systems are not required to be on the interface card. This reduces the costs of a given implementation.

In a general-purpose computer system, the processor has access to a variety of memory structures. The main memory of the computer system can be accessed through a cache to provide the processor with rapid access to the memory without having to wait for memory refreshes. The main memory itself is considerably faster than other storage in the system, and is directly accessible to a variety of interface cards through the use of direct memory access (DMA). DMA allows the processor to directly transfer data to buffers on the interface cards, and at the same time, allows the interface cards to directly place data in an input buffer for the processor. The use of DMA access reduces the processor time dedicated to moving data to and from an interface card. Those skilled in the art will appreciate that the implementation of DMA access between the main memory and buffers on interface cards is known in the art.

As an interface card receives data, it will provide the data to an input buffer accessible to the processor. Prior to being filled, this buffer must be checked by the processor so that buffered data is not dropped. By appropriately sizing the buffer, and setting a processor check cycle, the lag introduced by the buffering can be controlled so that it is insufficient to be noticeable to callers. Additionally, by setting fixed times for the processor to check the buffer, the amount of processor time spent on the media processing can be controlled so that the media processing does not render the computer otherwise unusable.

A problem arises in this implementation, in that common computer systems do not run true real-time operating systems. Although a real time operating system would allow the processor to be scheduled to check the input buffers, they do not have a large library of computer software available, and thus are not suitable for these systems. The problem of providing pseudo-real-time scheduling on a non-real time operating system must now be addressed.

Operating systems are responsive to a number of different inputs. Multitasking or multithreading operating systems make use of rudimentary scheduling on common computing platforms to allow a variety of tasks to be executed serially, but in such rapid succession that a computer user perceives that the tasks are being executed in parallel. With some processor designs, it is possible for a limited number of tasks to be executed in parallel, but the availability of these systems cannot be guaranteed and thus, a single task processor must be the model. Different tasks sharing the same processor are typically provided with priorities, allowing high priority tasks to use more processor cycles than a low priority task. However, unless the number of applications run on the processor is known in advance, it is not possible to design a standard application that will have reliable processor control without causing a noticeable degradation in the system performance.

To allow the media data to be processed by the processor at fixed time intervals, a reliable clocking system is employed. Numerous standard clocking systems can be used to provide reliable clocking in a personal computer including the use of clocking signals generated from the known hardware cards, or the use of external clocking signals such as those provided by connections to a PSTN. As a plurality of cards may be present in the system, each having a clock operating independently of the other cards, the signals may not be aligned. However, it is possible for the host processor to determine that all the cards have provided a clocking signal, and thus use the last of the cycle as an indicator that the clock has ticked. The clocking signals generated by synchronous cards, indicates that data has arrived. Upon receipt of the final clock tick, all the cards will have received their data. Asynchronous data sources can be synchronized to the synchronous data sources, by taking the data from the asynchronous data sources at the fixed intervals determined by the synchronous clocking signals. Although this technique provides stable clocking, it should be noted that a master clocking signal can be implemented and used to the same effect without departing from the scope of the present invention.

Because the clocking signal indicates that data is in place, it also indicates that the data should be read by the processor. To ensure that the processor suspends non-essential activities, a deferred procedure call (DPC) can be generated by a scheduling system tied to the clocking signals. A DPC is a software based call that serves as a high priority signal much like a hardware interrupt. The only process that overrides a DPC is a hardware interrupt. By generating a DPC, and requiring the processor to read the media data transferred to its input buffers by DMA, the system is able to provide reliable clocked service at fixed time intervals to avoid introducing lag to the call processing. DPCs are known in the art as a function of Microsoft Windows operating systems, other operating systems have similar functions with different names (e.g. in the Linux operating system these are referred to as tasklets).

DPC is a term commonly associated with the Windows computing platform. Other operating systems make use of similar function calls with different names. The equivalents in other operating systems will be known to those skilled in the art and are high priority software based interrupts that can be triggered by a clocking signal. The generation of DPCs on an ongoing basis in a software application is unconventional, as many in the field have put forward the position that the use of DPCs degrades the performance of a system and renders it insufficient to support other tasks.

In crude implementations attempted in the past, this may be true, but embodiments of the system of the present invention, are sufficiently refined that the degradation of the system is avoided. Because of the DPC being generated with a clock tick, the processor will be required to perform a media processing action at the start of every clock tick. It is only after the media processing has been performed that the processor is able to clear the DPC.

The media processing can entail a number of different functions. In some instances, multiple interface cards will be employed to connect a plurality of different parties, and the system will be acting like a conference bridge, summing input signals and providing them as output to each of the connected parties, in other instances the system will be serving as a node in the middle of the connection and will be recording the call for later review, and in yet further instances, the system will be connecting distinct media stream technologies, such as circuit switched voice calls over a PSTN being connected to a packet switched Voice over Internet Protocol (VoIP) network. In other instances, the system will be analyzing the data to see if events have occurred that trigger other actions, such as the detection of a remote party initiating a three party call triggering either a recording of the conversation of a cessation of the call.

The data that is being processed is arriving in real time, but can be subjected to slight time lags without the time lags being noticed. Thus it is queued so that action can be taken by the processor. The tasks that the processor performs on the data are discrete, and not all of the tasks need to be performed at every tick. Thus, the tasks that the processor must perform can be reduced to a series of small tasks, that can be executed in a small portion of the clock tick, allowing the processor to receive a DPC, service the media data stream, clear the DPC and continue other computing functions without severely impacting upon the performance of the computer. In many systems a clock tick will correspond to 1 ms time windows, although one skilled in the art will appreciate that windows of different sizes can be implemented without departing from the scope of the present invention. Embodiments of the present invention make use of a dynamic task scheduler to breaks tasks into chunks that can be serviced in less half of the tic period. Thus, the majority of the 1 ms time window is still left for other processing activities.

To allow this task scheduling, consider the following example. The analysis of audio received to determine whether or not a remote party has initiated a multiparty call. This function maybe used to allow controlled calling environments to detect when a person calls a third party who then connects them to another party in an attempt to avoid the controls in place. The signalling signals that correspond to the initiation of a multiparty call persist for more than 1 tick. The processor can, in much less than half a 1 ms time window, perform the required data processing for media data in an analysis window larger than the time window length. For example, an analysis window of 24 ms can be established for a particular type of media processing. Thus, the media stream will be buffered so that 24 ms of data is stored. When that buffer is filled, a DPC is generated by the scheduler that requires that the processor process the 24 ms of buffered data to determine if a multiparty call has been initiated. This processing is performed, the DPC is cleared, and the processor will not be called back to analyze the contents of that buffer for an additional 24 ms. Thus, the functions performed by the processor will be divided into constituent elements, that are designed to be completed in a fixed amount of time. Because each task completes in a small fraction of the time window, even if multiple different tasks were required in a single time window, the computer system can continue to run other applications without noticeable performance degradation. Analysis windows of different sizes can be established for different tasks, although it may be preferable to establish an arbitrary maximum analysis window size as an integer multiple of the time window to allow effective real time processing of data. One suggested maximum analysis window size is 30 ms.

Upon performing the media processing, which may modify the data, the resulting data is either used to make a decision, or the result, such as a combination of two data streams, can be transmitted as output. As previously described, the processor can directly write outbound data to the interface cards using DMA, or can have the outgoing data transferred from a memory location to the output cards using DMA. The implementation of this data transfer will be well understood by those skilled in the art, and numerous implementations can be used without departing from the scope of the present invention.

The use of DPCs to initiate data processing, allows the processor to be interrupted only by a hardware interrupt, and still provides the system a pseudo-real-time functionality that allow media data to be processed without introducing noticeable lag.

The following example is presented for exemplary purposes only, and should not be considered to be limiting of the scope of the invention. Consider the case where a VoIP operator employs the system of the present invention as a bridge between a VoIP network and the PSTN. Calls received from the PSTN must be routed to a VoIP user, but the telephony features provided to the VoIP subscriber must be translated to TDM telephony signals, then they are transmitted to the PSTN. Voice packets are also received from the VoIP network, and must be converted to the appropriate format. Within the system, data is received from both networks and is buffered as discrete media streams. The buffered data from the PSTN is either MuLaw data (from the VoIP network) or A Law data (from the PSTN). The VoIP bridge makes use of a real time protocol (RTP) which receives packets, places them into the jitter buffer and controls the calling of echo cancellation and the appropriate codec. The jitter buffer is employed to address the jitter inherent in a system that does not guarantee in-order delivery of packets. The codecs are employed to decode the data from the VoIP wrapped format. Data is either MuLaw or A Law format is typically stored in 10 ms increments. Within the DPC scheduler, a task is called for each analysis window to process the data. Two 10 ms data blocks are typically wrapped together and send out as a single 20 ms VoIP data block into the network after headers have been attached. This concatenation of the data blocks reduces the amount of buffering that must be done, reduces the per task processing, and also reduces the number of packets that are transmitted into the VoIP network. When data is received from the VoIP network, it is processed by the RTP and placed into the media buffer. This data is then moved from the VoIP buffer to the output media buffer accessed by the PSTN interface card. The data is then taken by the PSTN card using DMA at fixed intervals.

The data is preferably transferred from one buffer to another at the start of a tick to allow the data to be in place for processing by DPC scheduled tasks that are executed after the data transfer. At some ticks, the processor is required to analyze the buffer of the VoIP call to determine if the data packets in the buffer include instructions to activate a call service, such as three way calling. At a point in the call, the routines checking for the data packet requesting a three way call is received, and is queued in the input buffer by the NIC. When the DPC associated with checking for that data is generated, the processor will determine that a request for a third party has been initiated, and will appropriately provide the VoIP subscriber with the resources required to connect a third party to the call. If the third party corresponds to a phone number in the PSTN network, the data is sent through the PSTN network using standard signalling to initiate the call to the third party. When the call is connected to the third party, and the other party is brought back into the call, the system will begin processing all three input data streams to create the three party call. If the third party is a VoIP subscriber on the same network as the first VoIP subscriber, additional media functions, such as a video call, may be required. Tasks that the processor would be servicing with the DPCs would include summing the audio signals from the two VoIP calls with the PSTN caller, and providing that signal as an output, while another DPC driven task would be to forward the video data from one VoIP caller to the other.

One skilled in the art will appreciate that these processes have different processing requirements, and thus, will have DPCs generated at different rates so that the processor time taken for the process is static, and will not overly consume processor resources.

By making use of a task scheduling system that breaks processing into fixed time interval actions, and then forces the processor to act at fixed time intervals through the generation of DPCs, the system of the present invention is able to provide pseudo-real time service while running on a non-real time operating system without monopolizing the processor time.

Figure 2:
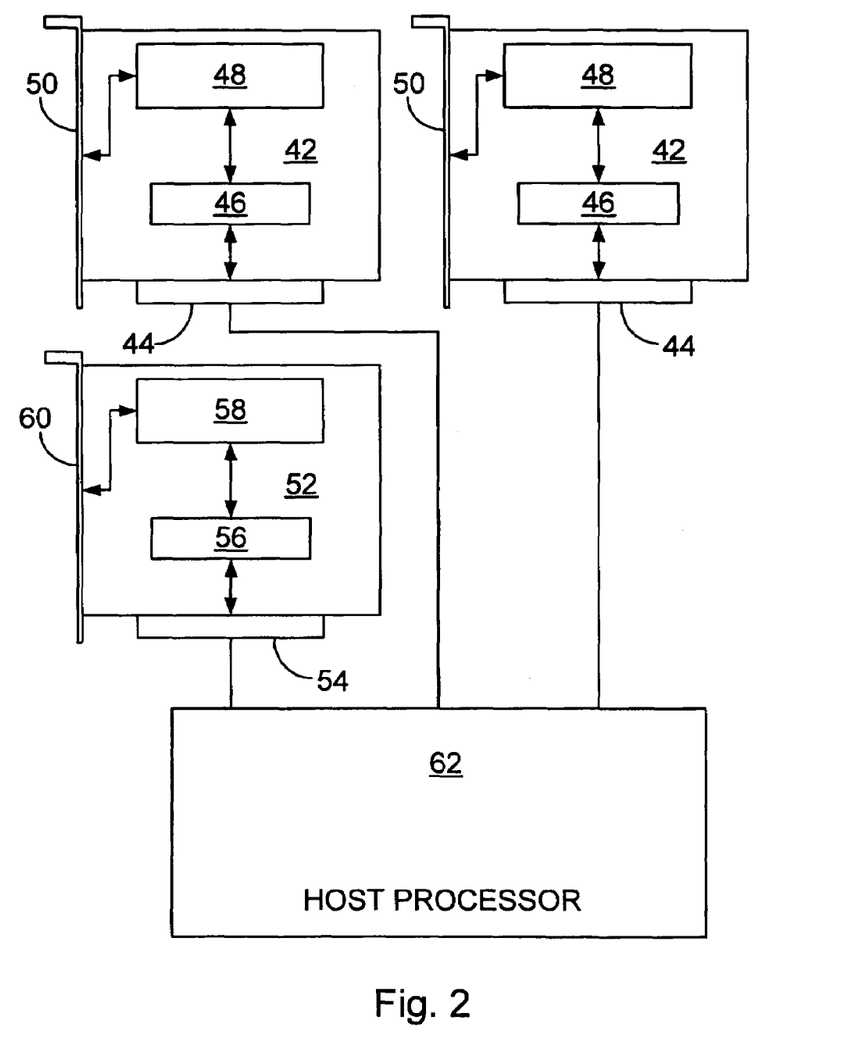
FIG. 2 is a depiction of a host processor processing media data stream data provide by IP network and PSTN type interfaces according to an embodiment of the present invention.

FIG. 2 illustrates an exemplary embodiment of the present invention. Expansion boards 42, serve as interfaces to external networks such as PSTN networks. Boards 42 connect to a host computer (not shown) through system bus connectors 44. The expansion boards 42 include local bus interfaces 46 in communication with network interfaces 48. The expansion boards 42 can be connected to networks such as the PSTN or PBXs through connection planes 50. Although two expansion boards 42 are depicted in the example of FIG. 2, the number of expansion boards is variable and need not be identical to the exemplary illustration.

Also shown is network interface card (NIC) 52, such as an Ethernet networking card, for interfacing with an Internet Protocol (IP) network. It will be appreciated that though referred to as a NIC, the networking interface need not be a discrete card and will often be implemented as a component available on the computer motherboard instead of as a discrete peripheral card. The IP network interface card 52 is for connecting to the host computer through system bus connectors 54 and includes the system to local bus interfaces 56 in communication with the network interface 58. The IP NIC 52 can be connected to IP networks through the connection plane 60. The host processor 62 is in communication with each of the expansion boards 42 and with NIC 52 via the local bus interfaces 46 and 56, which can include PCI buses. The host processor 62 is for performing switching and signal processing of the media data streams provided by the expansion boards 42 and IP NIC 52. Although only one IP NIC 52 is depicted in the example of FIG. 2, the number of network interface cards for interfacing between the host processor and networks, be they the Internet or other networks, can vary.

In order to be able to perform the required media stream switching and data processing on the host processor 62 without any apparent choppiness in the switched and processed media stream data, special consideration is given to: (1) transferring the audio data streams between the expansion boards 42 and the host processor 62; (2) switching audio streams on the host processor 62; and, (3) processing the audio stream data on the host processor 62. Audio stream data flow is depicted in FIG. 3 in an exemplary embodiment where two expansion boards 42A and 42B transfer data to and from the host processor 62.

Figure 3:
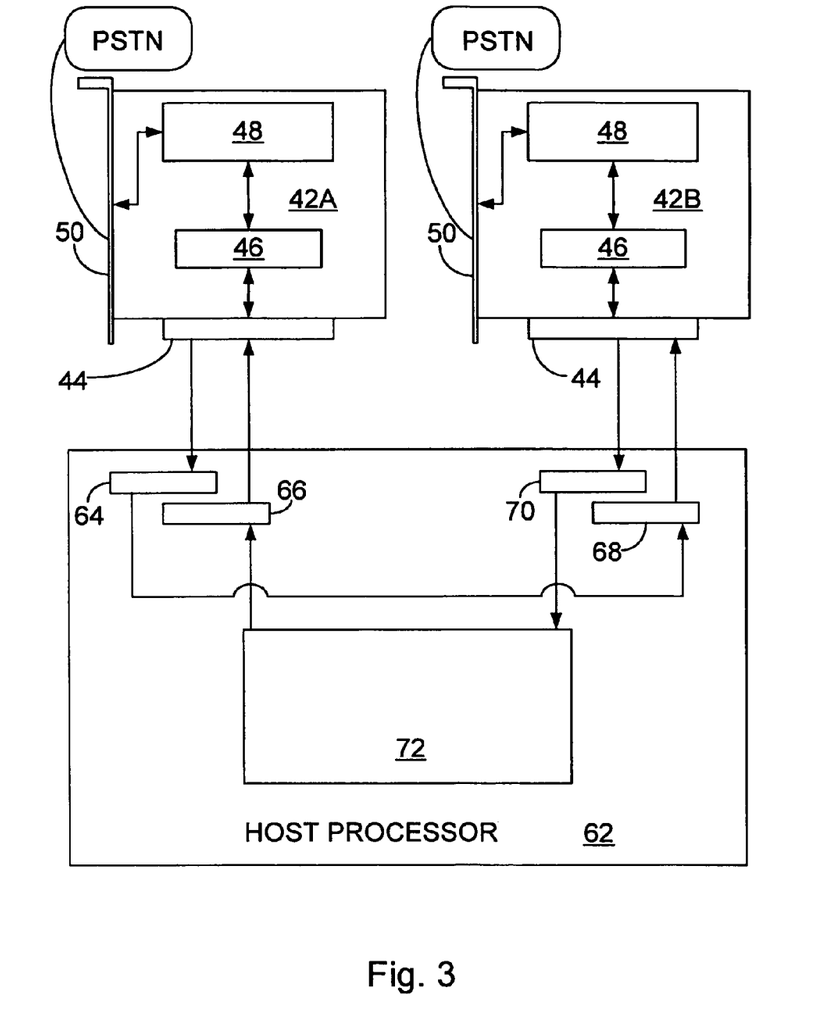
FIG. 3 is a depiction of data transfer between a host processor and expansion boards according to an embodiment of the present invention.

In FIG. 3, board 42A receives data frames from a PSTN network through connection plane 50. Connection plane 50 is also used when board 42A transmits data frames to the PSTN network. Data frames received from the PSTN are sent to a processor input buffer 64 using DMA. Similarly, board 42B receives data from a PSTN and sends the data frames to input buffer 70 using DMA. At fixed intervals, determined by a clocking system which can be derived from either of the expansion cards 42 or by a master clocking system, a DPC is generated. The processor, upon detection of the DPC, suspends processing, and acts on the data in input buffers 64 and 70. If the host processor 62 is bridging the PSTN networks, the data in the buffers is either processed to convert the media format and transferred to each of the output buffers 66 and 68, or the data from each input buffer is transferred to the processor output buffer (depending on how the echo cancellation systems are deployed). Upon transferring data to the output buffers 66 and 68, the DPC is cleared, the processor resumes the interrupted task. The output buffers have at least a portion of their contents transferred to boards 42A and 42B using DMA during every tick. The DPC scheduler is responsible for ensuring that data is in the output buffers. By having the contents of the output buffers transferred to the interface cards at fixed intervals, the data is provided synchronously and the processing that would be incurred by transferring the data upon the completion of a set of transfer criteria is avoided. This data is then sent to the respective PSTN networks as data frames.

The ability to transfer audio data between an expansion board 42 and the host processor 62 quickly and reliably is important. Analyses show that latencies shorter than 1 ms are required for the to avoid perception of lag. A prior art approach was to use a process running on the host processor to read and write audio data to the expansion board. However, this approach cannot guarantee delays below 10-15 milliseconds on non-real time operating systems such as those listed above. The use of DPCs to cause the processor to suspend other tasks allows the delays to be minimizes.

Figure 4:
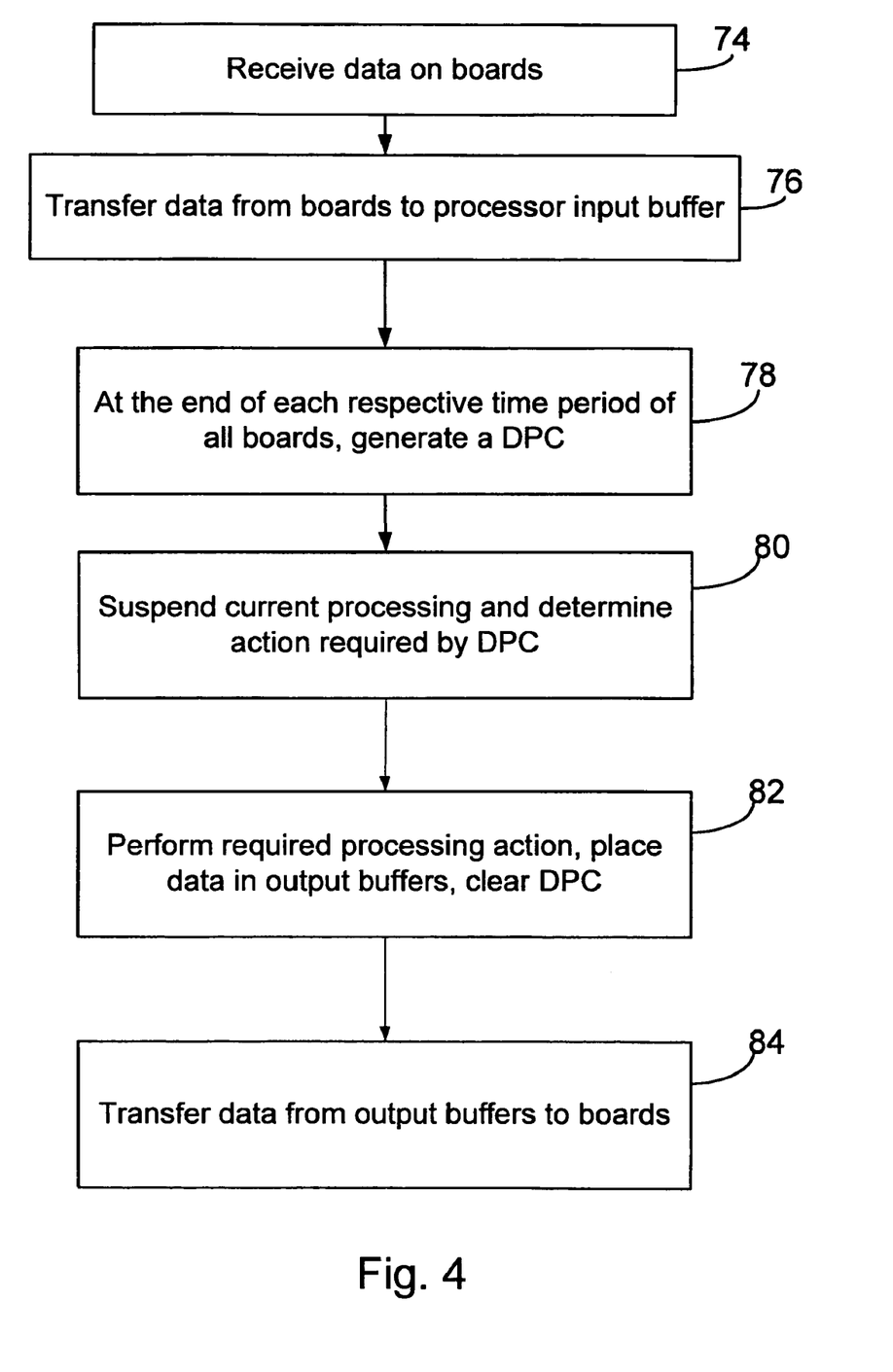
FIG. 4 is a flow chart representation of data transfer from expansion board to the host processor according to an embodiment of the present invention.

At the end of each tick, a routine on the host processor 62 generates an override interrupt such as a deferred process call (DPC) interrupt requiring the processor to suspend processing unrelated to the media data and to begin the media processing, which can include switching. The above-described process is illustrated in the flowchart of FIG. 4. Data is received by the boards in step 74. The data is transferred from the boards to the processor input buffers in step 76. At the end of the timing period determined by the clocking signals of the boards, a DPC is generated in step 78. The processor suspends current processing, and determines the action required to clear the DPC in step 80. In step 82 the required action is performed, and the result is placed in the processor output buffers 66 and 68, and the DPC is cleared allowing the processor to resume the suspended processing. In step 84 the data is transferred from the output buffers to the boards.

In terms of data synchronization, the media stream data transfer to the processing module 72 can be controlled by the clocking signal attributed to the processor 62. This clocking signal is sometimes referred to as the system tic counter (STC), which is incremented when data from all expansion boards 42 has been received. Synchronization slips can occur upon clocking signals from one or more expansion board being different from the processor clocking signal. Slips occur in unit time period increments. Occasionally one time period worth of audio data will be dropped for data stemming from an expansion board with a fast clocking signal relative to the processor clocking signal. Similarly, one time period worth of audio data will be duplicated for data stemming from an expansion board with a relatively slow clocking signal. The decision to drop or to duplicate data that consistently arrives early or late from an expansion board is taken after a predetermined period of time.

Besides opening new markets such as, e.g., IP-PBXs, media processing servers and VoIP gateways, the utilization of the signal processing on a host processor can offer significant cost reductions due to the reduction in design complexity for the expansion boards such as boards 42. Technical challenges facing the VoIP signal processing component development are addressed through the use of reliable clocking to allow the asynchronous VoIP data to be synchronized to PSTN or PBX data, and the introduction of pseudo-real time processing allows for the data to be processed without introducing noticeable lags.

One of the concerns with the processing of VoIP packets is that they do not necessarily arrive in order, may arrive more than once, and may never arrive at all. These issues are common in VoIP applications, but are highlighted by the requirement of synchronization with the PSTN connections. To accommodate this, the VoIP data can be processed at slightly longer intervals to provide a greater chance for all the data to have arrived and to have been placed in order in the input buffers. This interval cannot be made too long, as the increased likelihood of receiving the packets will be more than offset by the increased lag, which necessitates more complex echo cancellation operations to prevent parties on calls from hearing their own voices after a time delay. The out of order arrival of VoIP data can be partially compensated for using standard jitter correction techniques.

In the presence of additional network traffic, the packet latency preferably increases by no more than the amount of time required to transmit those packets already queued for transmission, but not yet transmitted. Further, the maximum packet latency for a packet being received preferably does not exceed 1 ms from the time a complete packet has been received by the IP NIC 52 to the time it is available to the host processor micro-kernel.

In one implementation of the above described system, real time processing functionality is provided through the use of a micro-kernel executed on the non-real time operating system. The micro-kernel can be thought of as a mini-operating system that provides an application environment for real-time processing tasks to be run through. The micro-kernel provides a series of buffers that allow external components and applications to interact with each other while making use of the DPC scheduler that provides effective real-time processing. The DPC scheduler makes use of known variables, such as the ability of the host processor to process data at a given rate, and the length of time that the processor will take to perform certain tasks in view of its ability to process data at that rate. This information is used by the scheduler to determine analysis windows so that the data to be processed is queued in an efficient manner. The scheduler also serves to ensure that the processing required in a given clock tick does not exceed a predetermined limit, beyond which it would adversely impact the processing of other applications on the host processor. The micro-kernel also provides a messaging functionality for the applications relying upon the real time processing. This allows the real time processes to be started and stopped on the fly so that they can be scheduled in a fashion that allows media processing without exceeding the aforementioned acceptable impact on the processor load. The media streams are controlled through the micro-kernel, and the buffers are treated as generic by the micro-kernel. As a result be being considered generic, buffer handling is simplified and the micro-kernel does not need to differentiate between data types in the buffer handling. A processor executing a media processing application will be able to handle the data in different buffers in different manners, but relies upon the micro-kernel to create and destroy the buffers dynamically. This is in clear contrast to the dedicated hardware systems that provided buffers either on the peripheral card, or in main memory by accessible through DMA, as these buffers were static. The use of dynamic buffers allows better memory management and allows buffers to be expanded and contracted Thus, in accordance with the above, the present invention provides a method and system for processing media data on an asynchronous host processor. The method and system involve receiving media data, generating clocking signals, transferring media data to host processor buffers, generating media transfer done interrupts for each media data stream and generating an override interrupt to indicate to the host processor to process the media data. The override interrupt has high priority and effectively indicates to the host processor to forgo all other scheduled tasks and to start processing the media data.

One skilled the art will appreciate that a standard DMA technique referred to as scatter/gather DMA can be employed to transfer the data between the dynamic buffers and the interface cards. This DMA technique has been employed previously, but was not implementable with prior art media processing systems that made use of on-board processing. The scatter gather processing allows host-less flow control of data and reduces the overhead of the real time processing system. The use of TDM cards additionally allows the introduction of a stable high precision clock into systems that previously did not have precise clocking. The clock on at least one of the TDM cards can be employed to create a high precision clock accessible to the micro-kernel. The use of a plurality of TDM cards allows synchronization between different clocks by selecting one clock as a benchmark, and considering a tick to have occurred, only when all other clocks have ticked. Thus, the receipt of ticks from all external interfaces defines a single time window. This allows detection of slips in the clock detection and allows any of a number of reliable external clocks to be synchronized.

The interface of the system with the NIC, or other network interface components, can be managed through a media processor controlled by the micro-kernel. A NIC wrapper processor can be implemented to intercept audio packets received by the system and insert them into the streaming data at the DPC level. This reduces host processor handling of external data.

Figure 5:
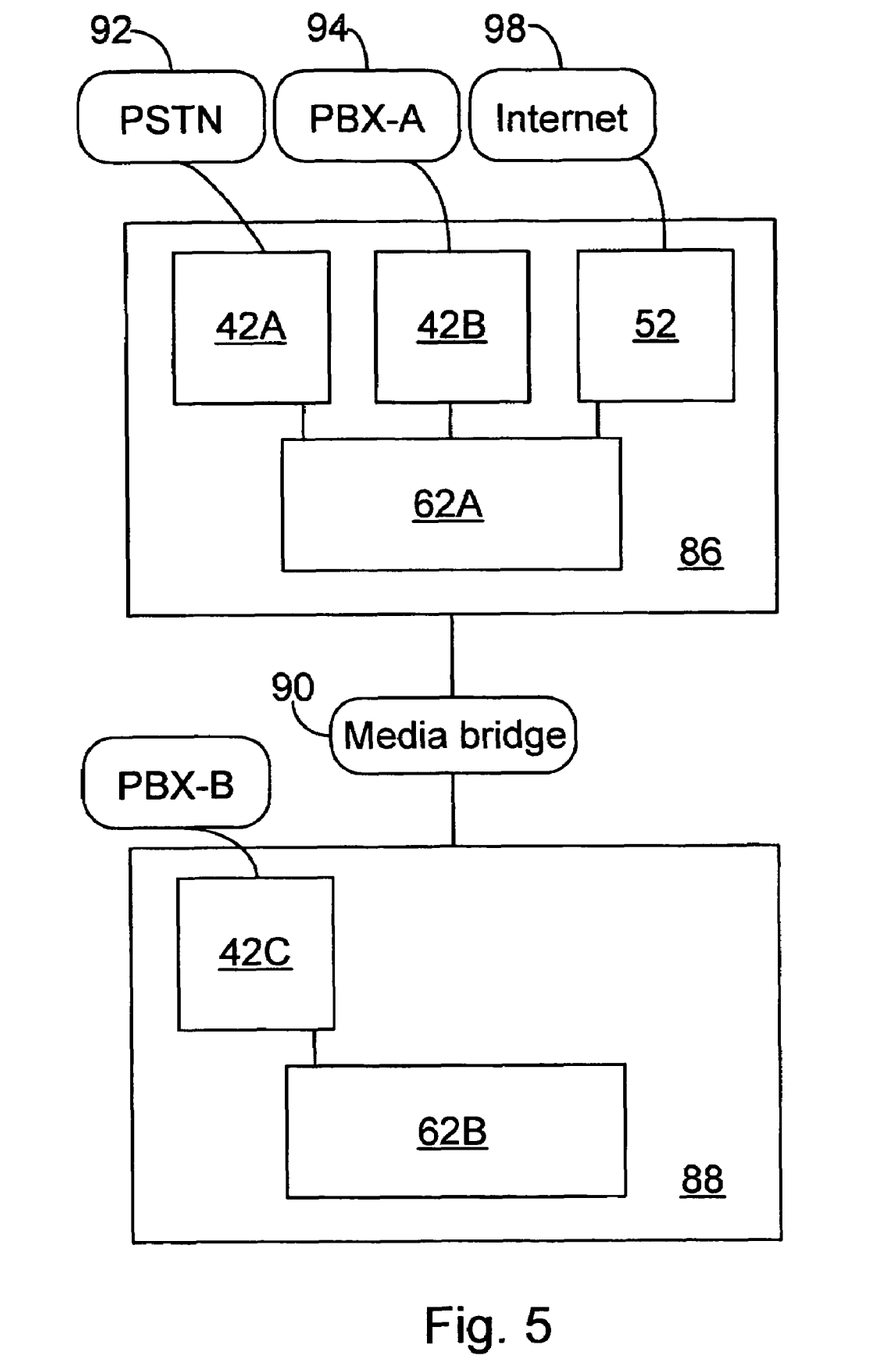
FIG. 5 illustrates the connection of systems using a media bridge according to an embodiment of the present invention.

FIG. 5 illustrates the connection of systems 86 and 88 using media bridge 90. System 86 is similar to above-described systems having host processor 62A, PSTN interfaces 42A and 42B, and network interface 52. System 88 includes host processor 62B and PSTN interface 42C. As illustrated PSTN interfaces can be connected to either a PSTN interface or a private branch exchange (PBX). Media bridge 90 is configured as another network interface for each of systems 86 and 88. The bridge 90 is provided with input and output buffers in each system. The systems are bridged to each other through the use of a dedicated hardware bridge that can be implemented by one skilled in the art. The bridge can provide a master clocking signal to both systems if required. The real time processing of the micro-kernel can be implemented to allow the data passed through the bridge to be treated either as another media stream or as a high priority buffered task. In a presently preferred embodiment, data received by one system and destined for a network connected to the other system is processed by the system that receives the data and is then transferred to the media bridge, which then directly places the processed data in the output buffer associated with the destined network. This reduces the processing overhead for the host processors. Conversely, data destined for another network can be provided directly to the bridge and the media processing can be left to the host processor of the system that is connected to the destined network. The use of the media bridge to directly forward data to the output buffer associated with the destination network can allow the latency of the bridged system to be kept low enough that the delay is not noticeable to human callers on the network.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A system for pseudo-real time processing of media data received from a plurality of sources using a non-real time system, the system comprising:
   a first media interface, for receiving an asynchronous media data stream from a first external communications network, and for placing received media data into a first input buffer;
   an interrupt scheduler for scheduling execution of a media data processing task on the media data in the first input buffer, and for generating an interrupt signal at fixed time intervals determined in accordance with the speed of the processor and an analysis window set in accordance with a media type of the media data;
   a general purpose non-real time processor for suspending processing of other tasks upon receipt of the interrupt signal, for executing the scheduled task on the media data in the first input buffer within a time window that is shorter than the analysis window, and for providing the output of the scheduled task to a second output buffer; and
   a second media interface, for transferring data in the second output buffer to a second external communications network.

2. The system of claim 1 wherein the first media interface further includes a first output buffer and means to transfer data from the first output buffer to the first external communications network.

3. The system of claim 2 wherein the second media interface further includes a second input buffer for receiving data from the second external communications network.

4. The system of claim 3 wherein the media processor includes direct memory access means for accessing the contents of the first and second input buffers.

5. The system of claim 3 wherein the media processor includes a means for executing scheduled tasks in accordance with scheduled tasks on the data in the second input buffer and for providing the output of the scheduled task to the first output buffer.

6. The system of claim 1 further including a third media interface, having third input and output buffers, the interface for receiving data from a third external communications network, for placing the received data into a third input buffer, and for transferring data in the third output buffer to the third external communications network.

7. The system of claim 1 further including a media bridge for allowing similar system access to the first and second media interfaces.

8. The system of claim 1 wherein the general purpose non-real time processor converts the media data in the first input buffer to a format of the second external communications network.

9. The system of claim 1 wherein the interrupt signal is a deferred process call.

10. The system of claim 1 wherein the first input buffer is sized in accordance with a data rate of the asynchronous media data stream and the fixed time interval.

11. The system of claim 1 wherein the interrupt scheduler causes the general purpose non-real time processor to resume processing of the other tasks upon completion of the scheduled task.

* * * * *

UNITED STATES PATENT AND TRADEMARK OFFICE
CERTIFICATE OF CORRECTION

PATENT NO. : 7,668,982 B2
APPLICATION NO. : 11/313774
DATED : February 23, 2010
INVENTOR(S) : Stroobach et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 726 days.

Signed and Sealed this

Fourth Day of January, 2011

David J. Kappos
*Director of the United States Patent and Trademark Office*